(12) United States Patent
Leban

(10) Patent No.: US 7,049,024 B2
(45) Date of Patent: May 23, 2006

(54) MEMBRANE ELECTRODE ASSEMBLIES AND METHOD FOR MANUFACTURE

(75) Inventor: Marzio Leban, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 397 days.

(21) Appl. No.: 10/428,171

(22) Filed: Apr. 30, 2003

(65) Prior Publication Data

US 2004/0220048 A1 Nov. 4, 2004

(51) Int. Cl.
*H01M 4/90* (2006.01)

(52) U.S. Cl. .......................... 429/40; 429/30; 429/104

(58) Field of Classification Search ................ 429/30, 429/40, 104
See application file for complete search history.

(56) References Cited

U.S. PATENT DOCUMENTS 5,449,697 A * 9/1995 Noaki et al. ................. 521/27
5,910,378 A * 6/1999 Debe et al. .................... 429/42
2003/0091885 A1* 5/2003 Kobayashi et al. ........... 429/32

FOREIGN PATENT DOCUMENTS

| JP | 64-048374 | * 2/1989 | ................ 429/27 |
| JP | 05-315000 | 12/1991 | |
| JP | 11-045729 | 2/1999 | |
| JP | 2002-280002 | 3/2001 | |
| JP | 2001-236971 | 8/2001 | |
| JP | 2002-184425 | 10/2001 | |
| WO | WO 2002/080299 | 3/2002 | |

* cited by examiner

*Primary Examiner*—Patrick Joseph Ryan
*Assistant Examiner*—Ben Lewis

(57) ABSTRACT

Reel-to-Reel method for making membrane electrode assemblies. A first catalyst is deposited in a repeating cell pattern on a first side of a proton exchange membrane film. A second catalyst is deposited on the back side of the proton exchange membrane. An electron conductor material is deposited on a support film which is adhered by means of an adhesive film to the proton exchange membrane film. The various layers are aligned and laminated together to form the membrane electrode assembly.

12 Claims, 11 Drawing Sheets

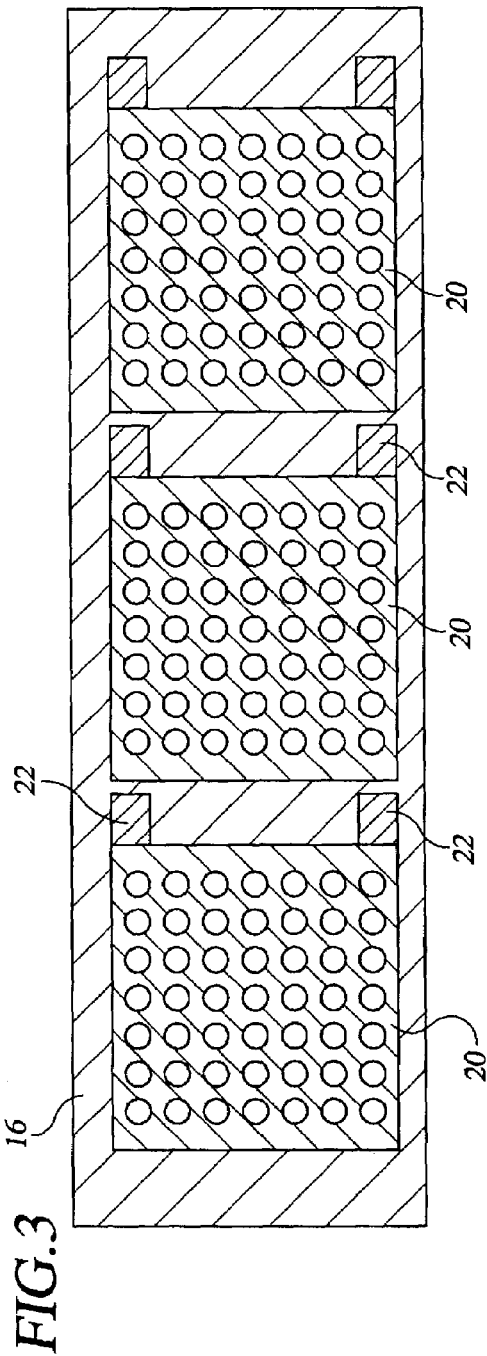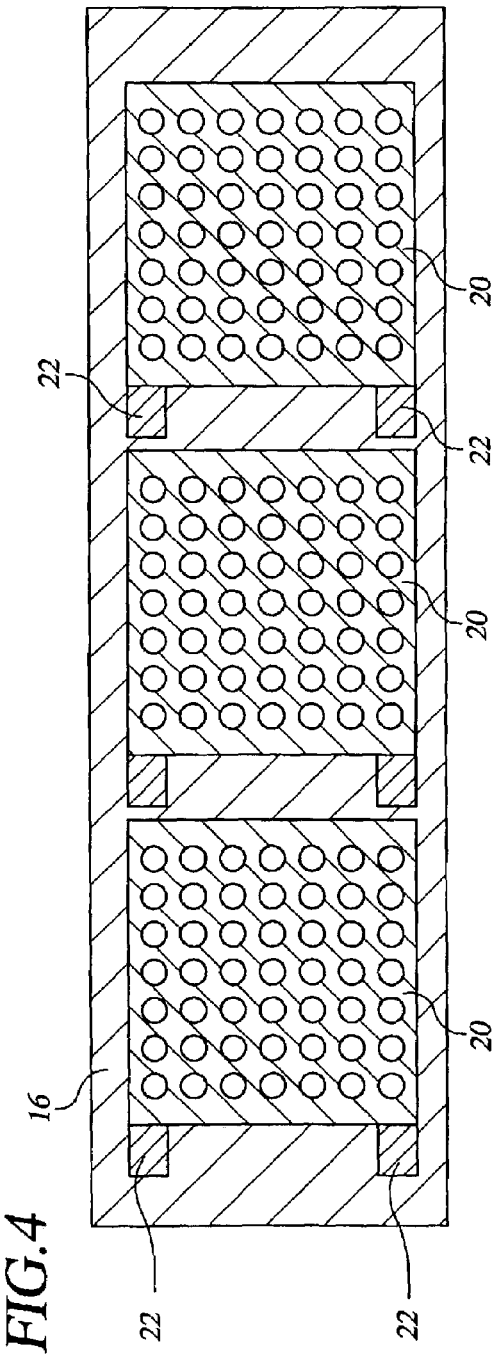

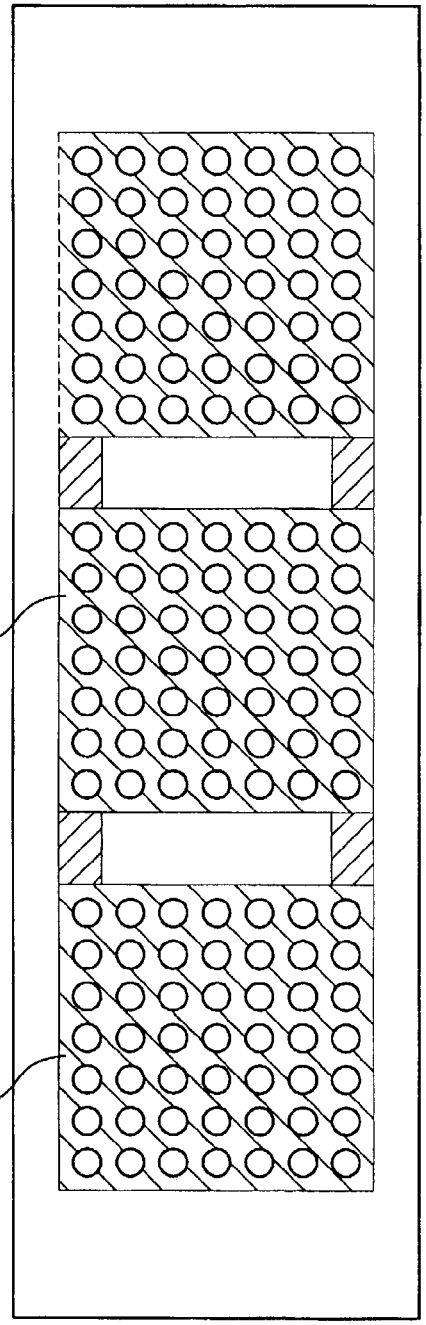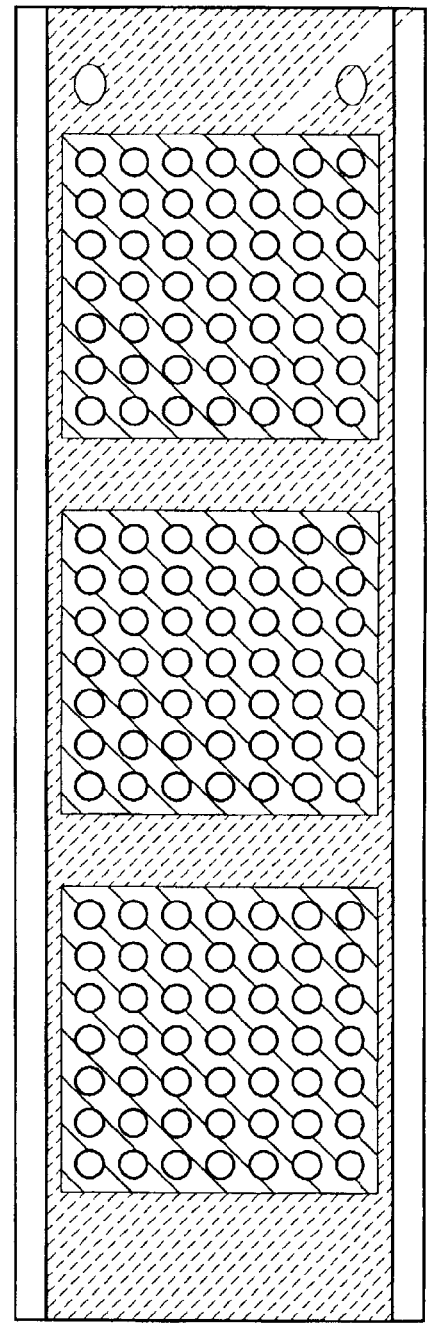
FIG.14
FIG.15

US 7,049,024 B2

MEMBRANE ELECTRODE ASSEMBLIES AND METHOD FOR MANUFACTURE

BACKGROUND OF THE INVENTION

Membrane electrode assemblies (MEA) are the core of fuel cells such as proton exchange media fuel cells which are well known. See, for example, "Fuel Cell Systems Explained," Larminie & Dicks, John Wylie & Sons, Ltd. (2000), the contents of which are incorporated herein by reference. Membrane electrode assemblies contain the electron collectors, the catalyst, and the proton exchange medium. Current methods of production of MEAs focus on individual units in which the catalysts are chemically deposited or inked on an electron collector and proton exchange medium. The elements of the unit are then sandwiched together with the application of heat and pressure to produce a single MEA. This prior art method is both costly and not easily scaled up to high volume production.

SUMMARY OF THE INVENTION

In one aspect, the invention is a method for making a membrane electrode assembly including providing an elongate proton exchange membrane film having a front and a back side. A first catalyst material is deposited in a repeating cell pattern on the front side of the film to form cathode regions of a plurality of unit cells. A second catalyst material is deposited in the repeating pattern on the back side of the film to form anode regions of the unit cells. An elongate support film perforated in the repeating cell pattern is provided and electron conductor material is deposited onto the support film in the repeating cell pattern along with electrical contact nubs. An adhesive film precut in the repeating cell pattern is also provided and the support and adhesive films are assembled on the front and back sides of the proton exchange membrane film with the repeating patterns of the respective films aligned and with the unit cells connected electrically. The assembled films are passed through hot rollers to laminate the films to produce the assembly.

BRIEF DESCRIPTION OF THE DRAWING

FIGS. 3 and 4 are plan views of Kapton support film with electron conductor material deposited thereon in one embodiment of the invention.

FIG. 14 is a planned view of a cell for parallel connection in one embodiment of the invention.

FIG. 15 is a planned view of a completed parallel connect PEM material cell in one embodiment of the invention.

DESCRIPTION OF THE PREFERRED EMBODIMENT

As set forth above, the method for making a membrane electrode assembly includes providing an elongate proton exchange membrane film having a front and back side. A first catalyst material is deposited in a repeating cell pattern on the front side of the film to form cathode regions of a plurality of unit cells. A second catalyst material is deposited in the repeating pattern on the back side of the film to form anode regions of the unit cells. An elongate support film perforated in the repeating cell pattern is provided and electron conductor material is deposited onto the support film in the repeating cell pattern along with electrical contact nubs. An adhesive film pre-cut in the repeating cell pattern is also provided and the support and adhesive films are assembled on the front and back sides of the proton exchange membrane film with the repeating patterns of the respective films aligned and with the unit cells connected electrically.

A suitable proton exchange membrane film is Nafion$^R$ available from Dupont Chemical Corporation. Nafion is basically sulphonated polytetrafluoroethylene. A suitable first catalyst material is platinum and a suitable second catalyst material is platinum-ruthenium.

In a preferred embodiment, a suitable support film is Kapton. Suitable electronic conductor materials are thin film carbon and thin film metals. The unit cells made according to the present invention may be connected electrically in series or in parallel.

It is preferred that the proton exchange membrane, the support film, and the adhesive film be fed from respective rolls and that the completed membrane electrode assembly is in the form of a continuous roll of material.

In another aspect, the invention is a fuel cell including a Z-folded strip including a plurality of electrically connected membrane electrode assemblies as described above. A pair of endplates support the Z-folded strip to create alternating anode and cathode chambers. Alternating fuel and air manifolds are provided in the endplates to complete a fuel cell.

The present invention thus produces membrane electrode assemblies in a reel-to-reel process. The method according to the invention allows MEAs to be constructed in a continuous process wherein each cell is connected electrically to the next either in series or in parallel as desired. With a series connection the desired voltage is proportional to the number of cells so that one simply chooses the appropriate number of cells and cuts them from the reel to form them into a stack. Alternatively, stacks themselves may be connected in series or parallel. The continuous production process of the invention is low cost and scalable to very high volume. The cells are internally connected, in series or in parallel, and any desired voltage may be selected by using the appropriate number of cells.

Figure 1:
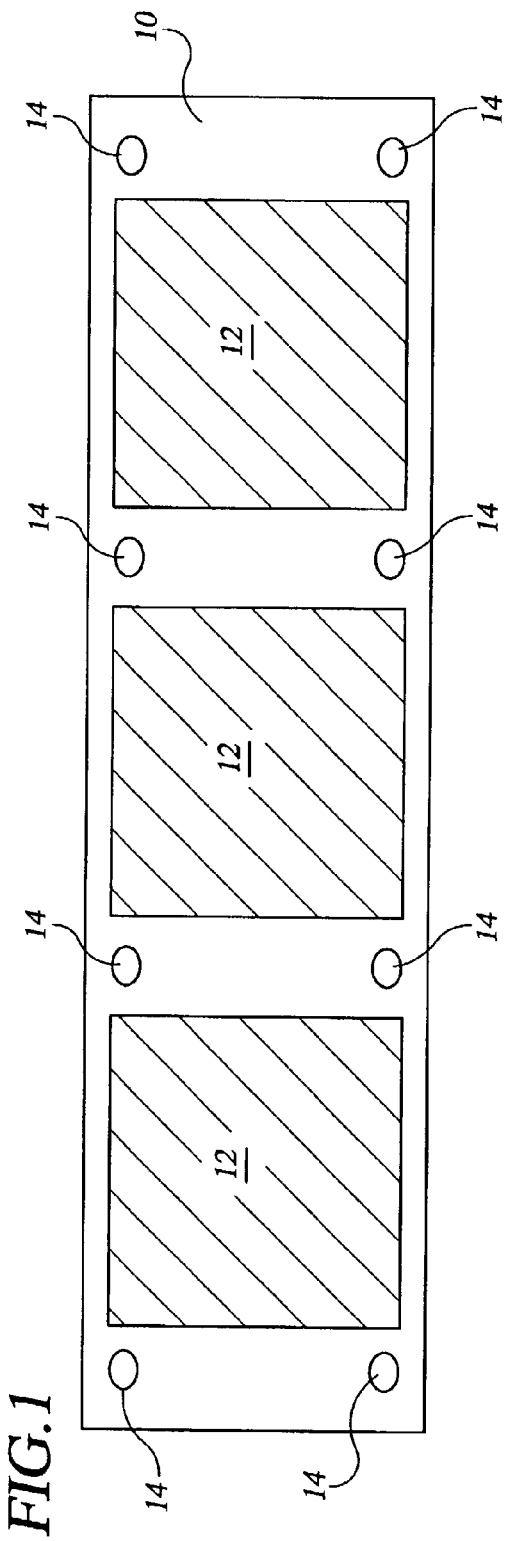
FIG. 1 is a plan view of a proton exchange membrane film with a deposited catalyst in one embodiment of the invention.

With reference to FIG. 1, a proton exchange membrane (PEM) film 10 is a polymer electrolyte membrane. A suitable membrane is a sulphonated fluoropolymer, often fluoroethylene, such as Nafion, a registered trademark of, and available from, the Dupont Chemical Corporation. A catalyst 12 is deposited in a repeating pattern on a front surface of the PEM film membrane 10. A catalyst is also deposited on the back surface of the film 10. Contact vias 14 are punched out of the membrane 10. For example, if the PEM 10 is intended for a direct methanol fuel cell, a suitable catalyst 12 is platinum to form a cathode region and a suitable catalyst for the other side of the PEM 10 is platinum-ruthenium to form an anode region. The catalysts are deposited by any suitable technique known to those skilled in the art. The catalyst pattern will define unit cells in a completed membrane electrode assembly as will become clear in this specification.

Figure 2:
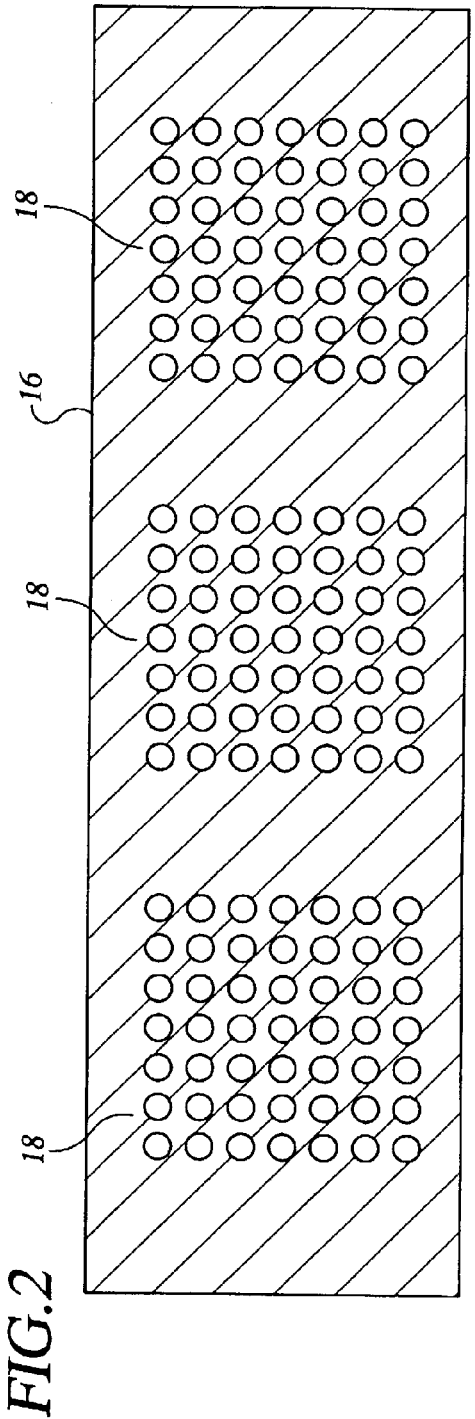
FIG. 2 is a plan view of a perforated Kapton support film in one embodiment of the invention.

With reference to FIG. 2, a support film 16 is preferably made of Kapton or other type of polyimide material or other suitable plastic material. The Kapton film 16 includes perforations 18 in the same repeating pattern as with the catalyst 12 shown in FIG. 1. The perforations 18 will allow fuel and air to reach the catalysts once the membrane electrode assembly is assembled. It is preferred that the Kapton film 16 be provided on and deployed from a roll. As shown in FIGS. 3 and 4, electron conductor material 20 and an optional catalyst is deposited on the Kapton film 16. A suitable electron conductor material 20 is carbon or thin film metal such as stainless steel. If desired, an optional catalyst may be deposited on top of the electron conductor material. The electron conductor and optional catalyst depositions can be achieved by sputtering through a shadow mask, for example. As can be seen in FIGS. 3 and 4, contact nubs 22 are located either on the right or left of the cell pattern depending on whether the Kapton film 16 is laminated on the front or back of the PEM film. The contact nubs 22 will eventually be in electrical contact, as will be described below. The nubs 22 will thereby form a continuous series electrical connection between cells along the completed membrane electrode assembly on a reel. Those skilled in the art will appreciate that parallel connection is equally possible and will be discussed below.

Figure 5:
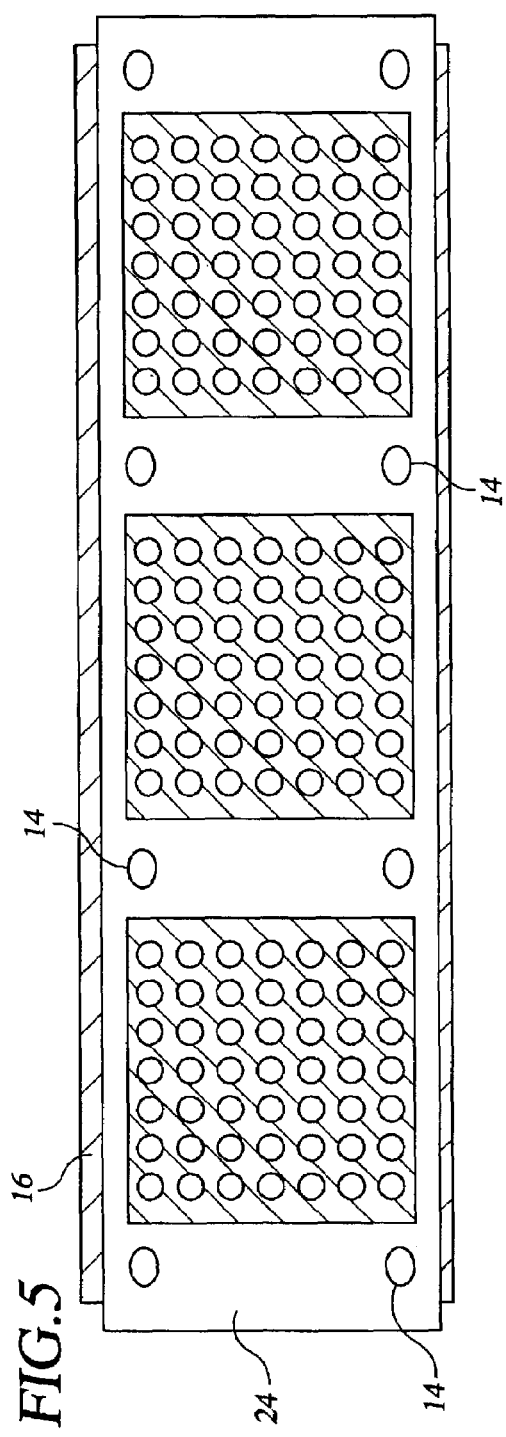
FIG. 5 is a plan view of Kapton support film with an adhesive film aligned and laminated thereon in one embodiment of the invention.

With reference to FIG. 5, an adhesive film 24 is pre-cut to expose the electron conductor/catalyst on the Kapton film 16 as well as the contact vias 14. A suitable temperature/pressure sensitive adhesive film 24 is based on epoxy, urethane, silicone or acrylate adhesive chemistry. The adhesive material 24 is in its low-tack form as it is aligned with the Kapton film 16 and laminated to it. The adhesive film 24 will be heat cured later in the process as described below.

Figure 6:
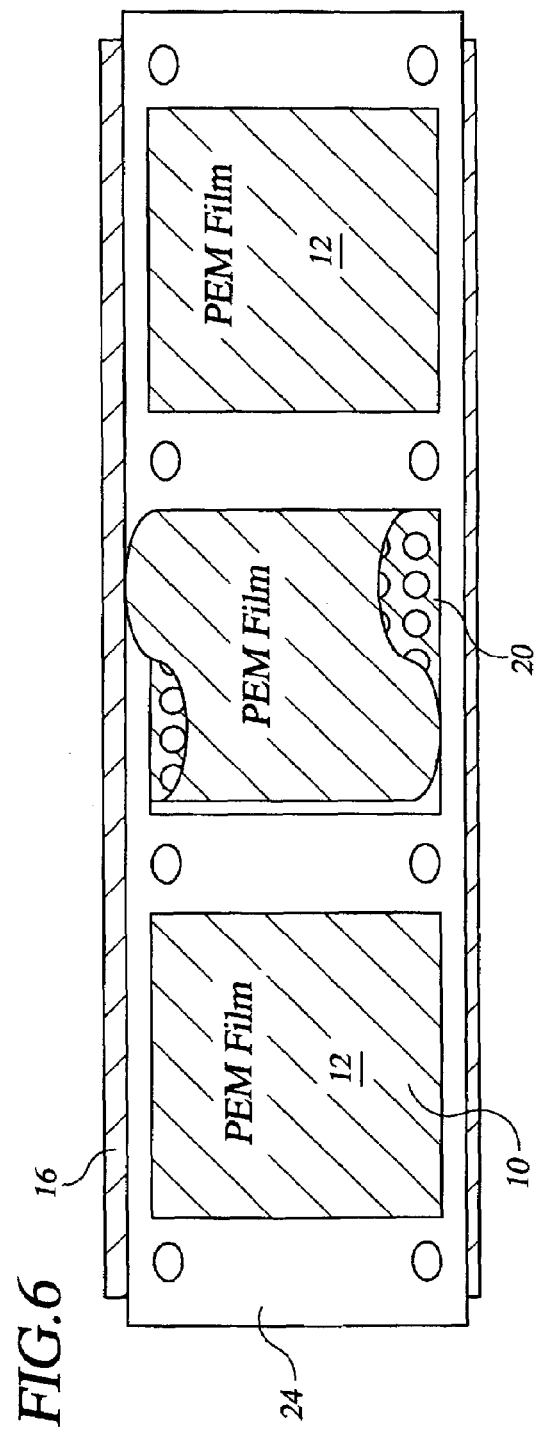
FIG. 6 is a plan view showing the alignment and lamination of proton exchange media over adhesive film in one embodiment of the invention.

With reference to FIG. 6, the PEM film 10 is aligned over the adhesive film 24/Kapton film 16 combination so that the catalyst area 12 is aligned with the perforations 20. As will be described below, a second adhesive film is also aligned.

Figure 7:
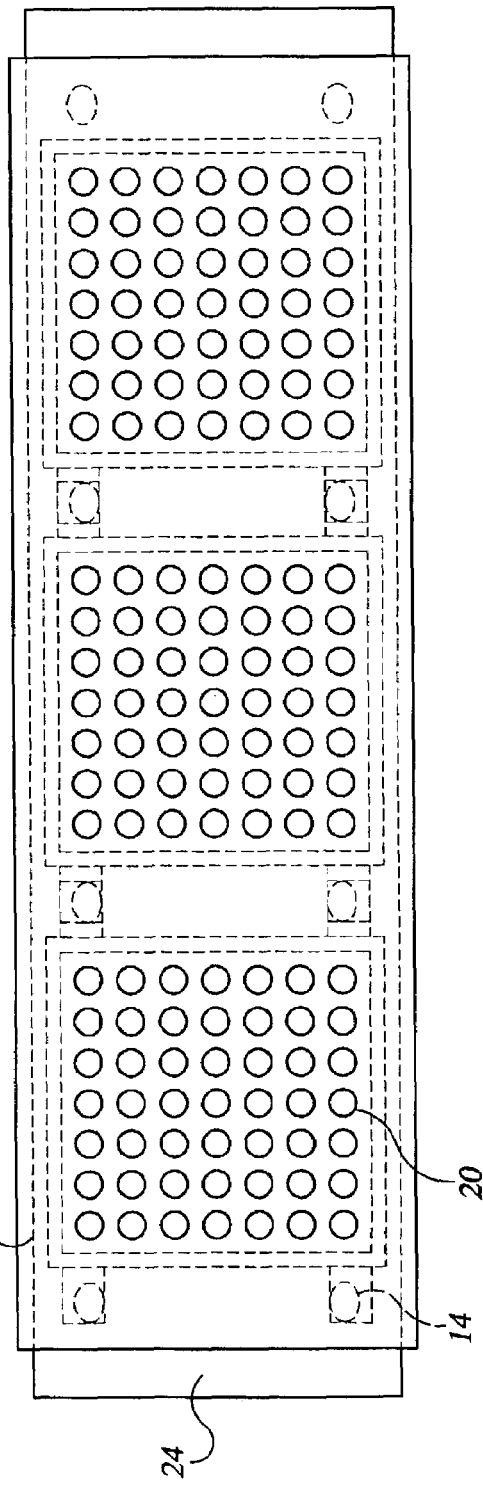
FIG. 7 is a plan view of a completed membrane electrode assembly of the invention in one embodiment of the invention.

As shown in FIG. 7, a second processed Kapton film described in FIGS. 3 and 4 is aligned and laminated over the adhesive film 24.

Figure 8:
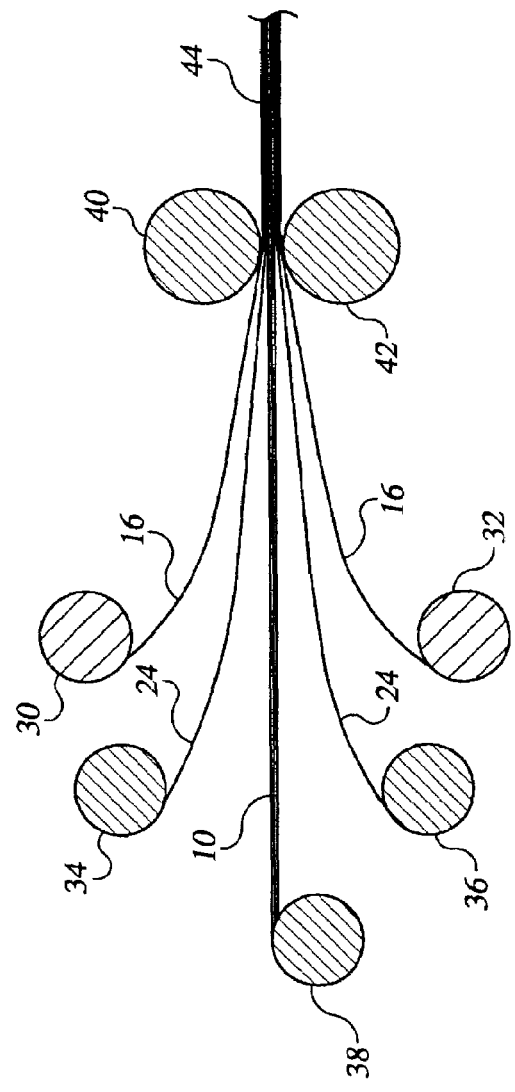
FIG. 8 is a schematic view illustrating the reel-to-reel process of the invention in one embodiment of the invention.

The overall process is shown in general terms in FIG. 8. Schematically, Kapton support film 16 is supported on rolls 30 and 32. Similarly, the adhesive film 24 is supported on rolls 34 and 36. Finally, the PEM film 10 is supported on a roll 38. As discussed above, these various layers are aligned and registered and passed through the nip of hot rollers 40 and 42 to produce the completed membrane electrode assembly 44 and as shown in FIG. 7. It will be appreciated that the individual cells are connected in series electrically. The completed membrane electrode assembly 44 may be wound onto a takeup roll (not shown).

Figure 9:
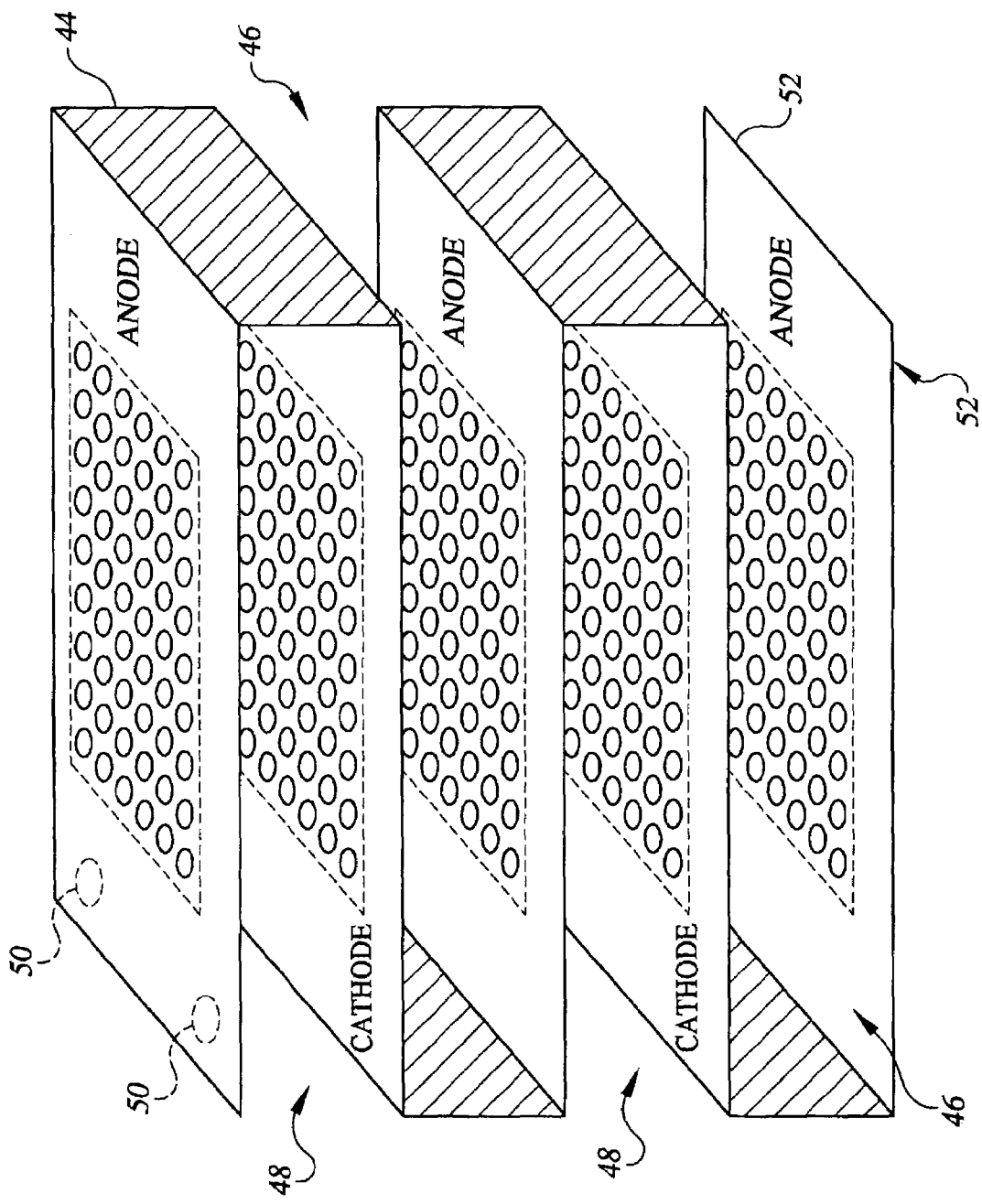
FIG. 9 is a perspective schematic view of a Z-folded membrane electrode assembly in one embodiment of the invention.

FIG. 9 illustrates a 5-cell strip of the completed MEA Z-folded to form alternating anode 46 and cathode 48 chambers. Electrical anode contacts are made at 50 and external cathode contacts are made at area 52 beneath the lower anode chamber 46. The cells in the Z-folded MEA of FIG. 9 are connected in series so that individual cell voltages are additive.

Figure 10:
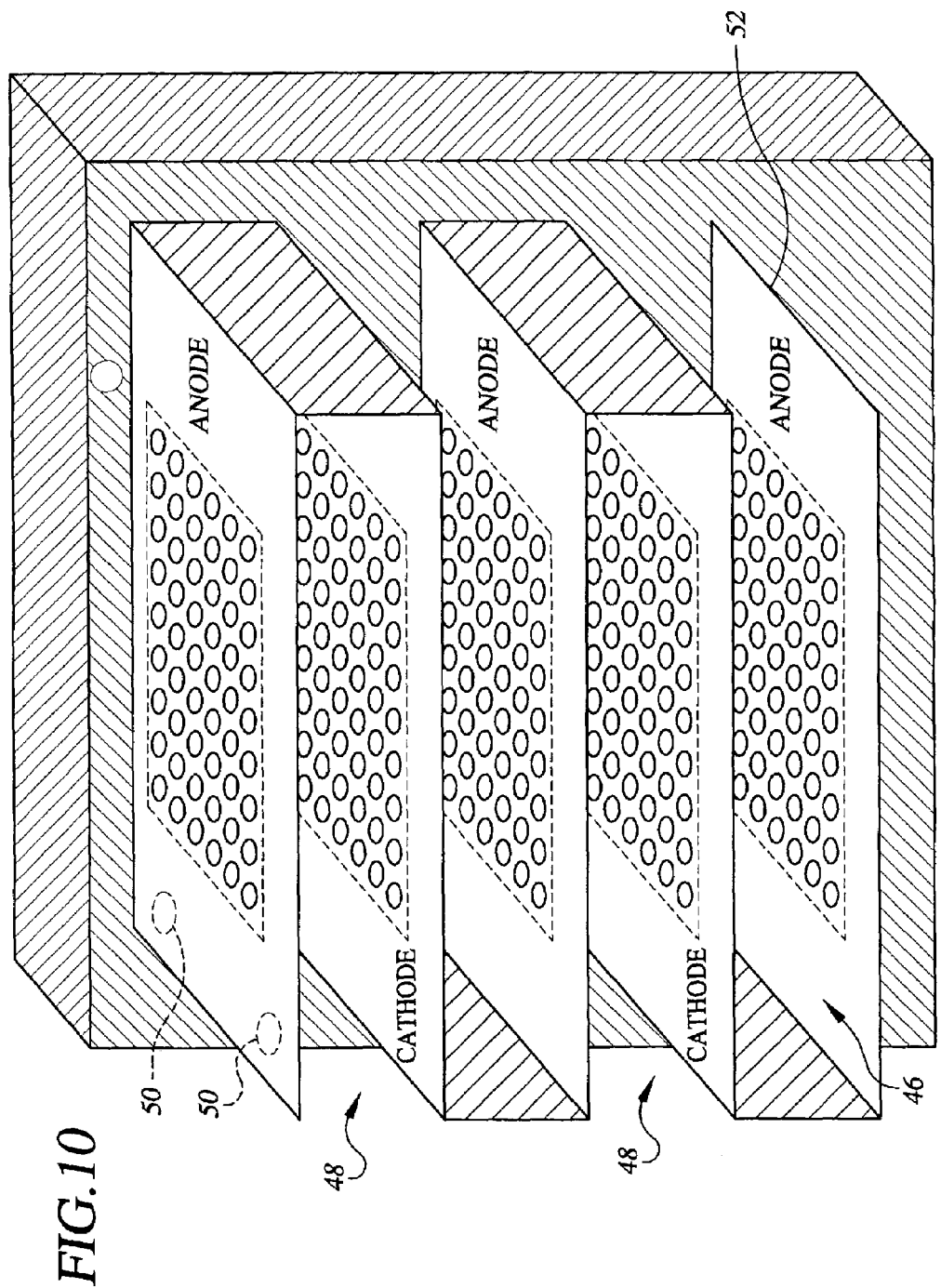
FIG. 10 is a perspective schematic view of a Z-folded membrane electrode assembly inserted into an endplate in one embodiment of the invention.
Figure 11:
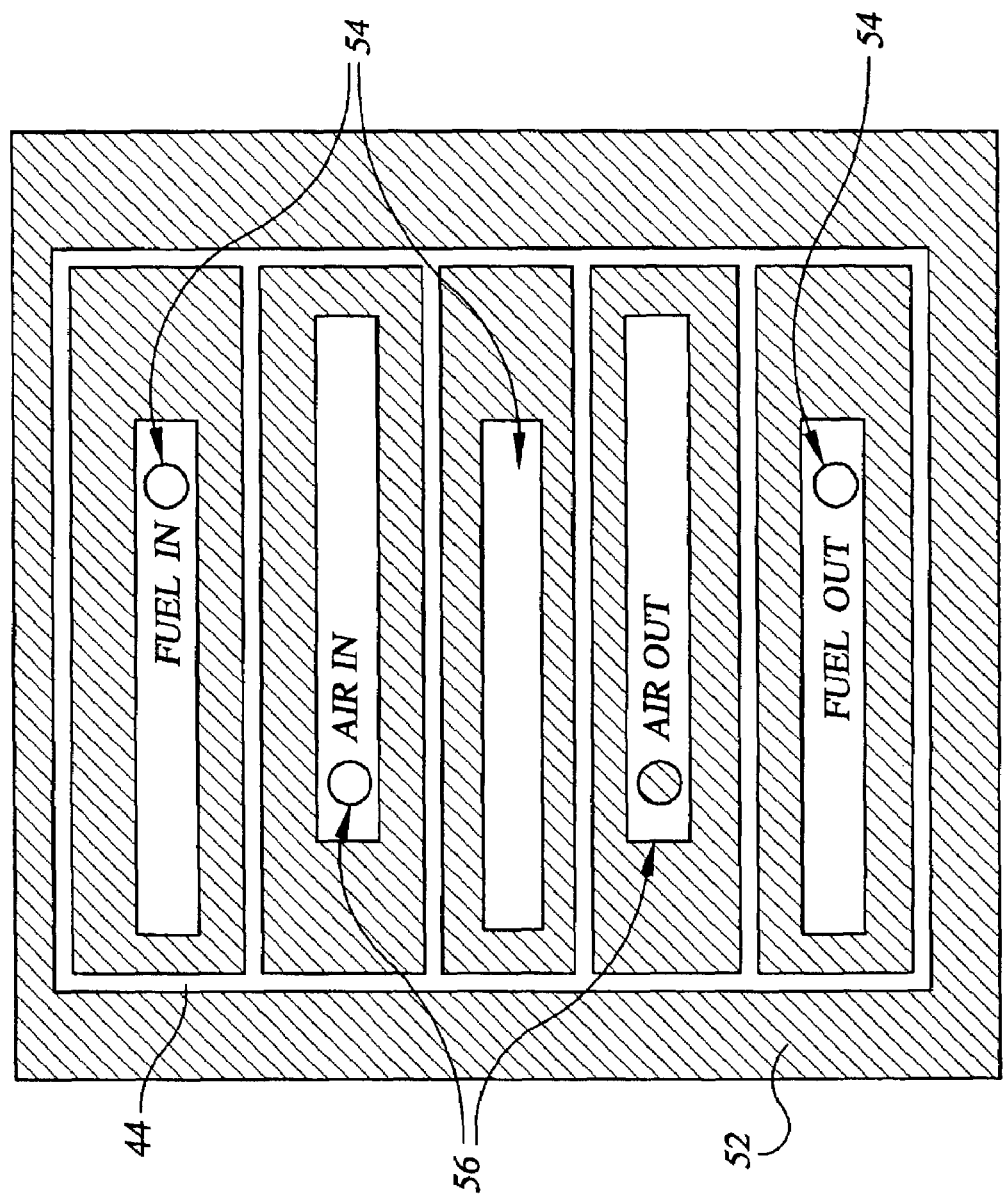
FIG. 11 is a cross-sectional schematic view of a fuel cell using the membrane electrode assembly in one embodiment of the invention.

As shown in FIG. 10, the Z-folded strip is mated to an end plate 52. Those skilled in the art will appreciate there will be a second end plate (not shown for clarity) to complete a fuel cell structure. As shown in FIG. 11, the MEA assembly 44 is bonded into a groove in the endplate 52. Alternating fuel manifolds 54 and air manifolds 56 are molded into the end plate 52 which may be made of plastic. In this way, fuel is brought into contact with the anode and air is brought into contact with the cathode of each of the cells in the unit. Those skilled in the art will appreciate that additional cover plates in addition to the two end plates complete the fuel cell stack.

Figure 12:
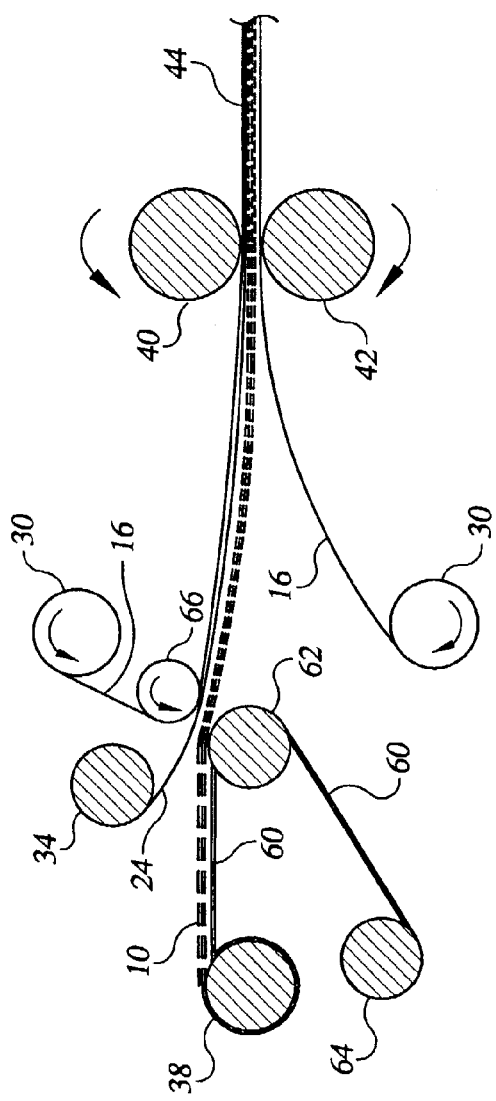
FIG. 12 is a schematic illustration of a roll transfer lamination process in one embodiment of the invention.

An alternative process referred to as a roll transfer lamination process is shown in FIG. 12. In this embodiment, the adhesive film 24 is pre-cut around each cell as with the earlier embodiment. The PEM material 10 is also pre-cut into squares designed to fit exactly into a cell opening left by the adhesive film 24. The pre-cut PEM material 10 is carried by a backing film 60 that passes over a transfer roll 62 and is discarded on a take up roll 64. The pre-cut PEM material 10 is transferred to the Kapton support film 16 at the location of a compression roller 66 and inserted into the opening left by the adhesive film 24. The thickness of the adhesive film 24 is adjusted to accommodate the thickness of the PEM material 10. Note that in this embodiment, only one adhesive film is required. As with the earlier embodiment, the material passes through the nip of hot rollers 40 and 42.

The process illustrated in FIG. 12 has several advantages. First of all it uses less of the expensive PEM material. Second, the process eliminates one adhesive film but requires the one used to be not only thicker but also to have a specified thickness. Finally, the adhesive film is not required to bond to the PEM material as in the earlier embodiment.

Figure 13:
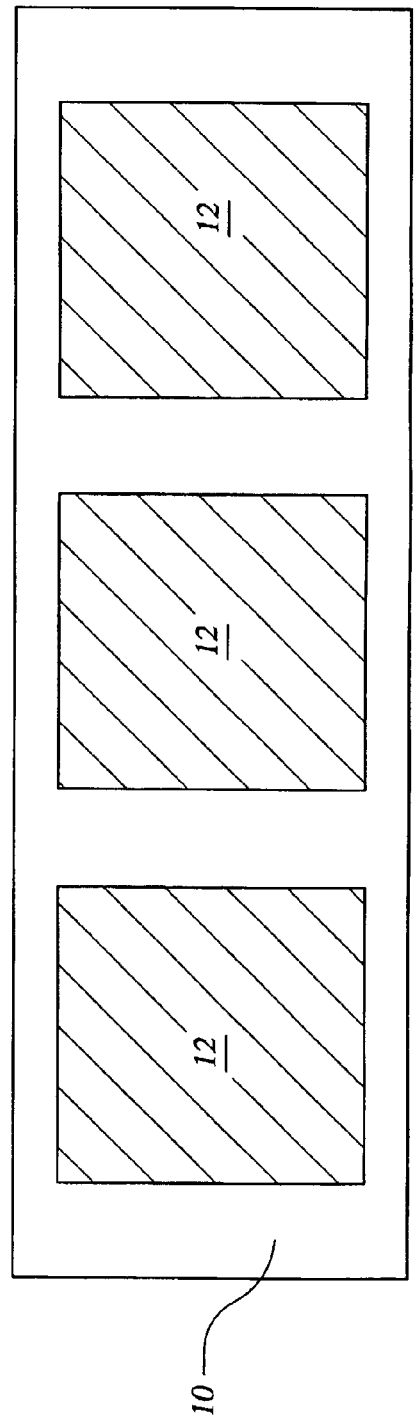
FIG. 13 is a planned view of a proton exchange membrane film with a deposited catalyst in one embodiment of the invention.
Figure 16:
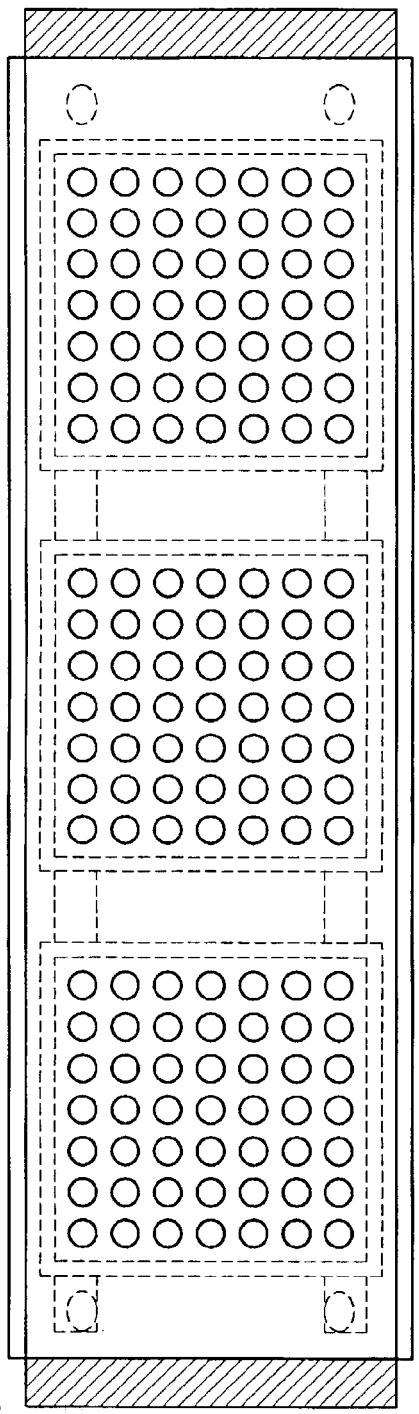
FIG. 16 is a planned view of parallel connected cells in one embodiment of the invention.

The roll transfer lamination process of FIG. 12 will be used to illustrate a parallel electrical connection of the individual cells. FIG. 13 is similar to the embodiment of FIG. 1 but note that there are no vias for parallel electrical connection. Note that in FIG. 14 adjacent cells are connected to each other unlike the embodiment of FIG. 4. Thus, in FIG. 14 all anodes are connected together and all cathodes are connected together resulting in a parallel electrical connection. Because anodes and cathodes are not connected to each other as in the series embodiment, only one type of Kapton film with appropriate thin film is required for either anode or cathode use as shown in FIG. 14. This parallel type of connection has the great advantage of not requiring internal connection which can complicate the process. The completed parallel connect PEM material is shown in FIGS. 15 and 16.

Figure 17:
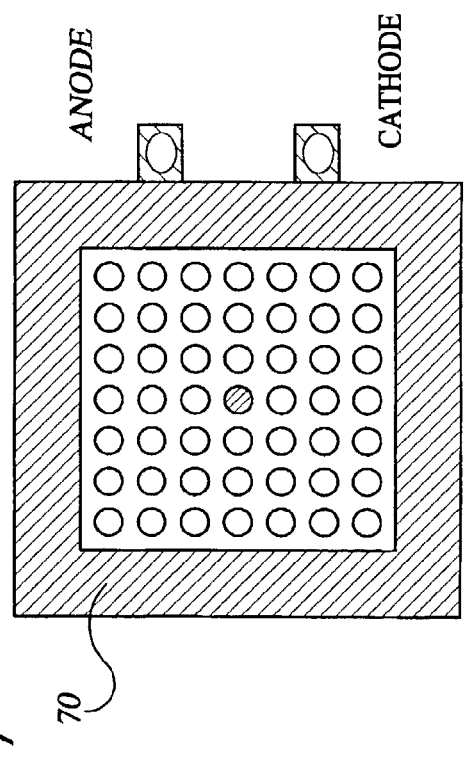
FIG. 17 is a planned view of a conventional flooded anode stacked design in one embodiment of the invention.
Figure 18:
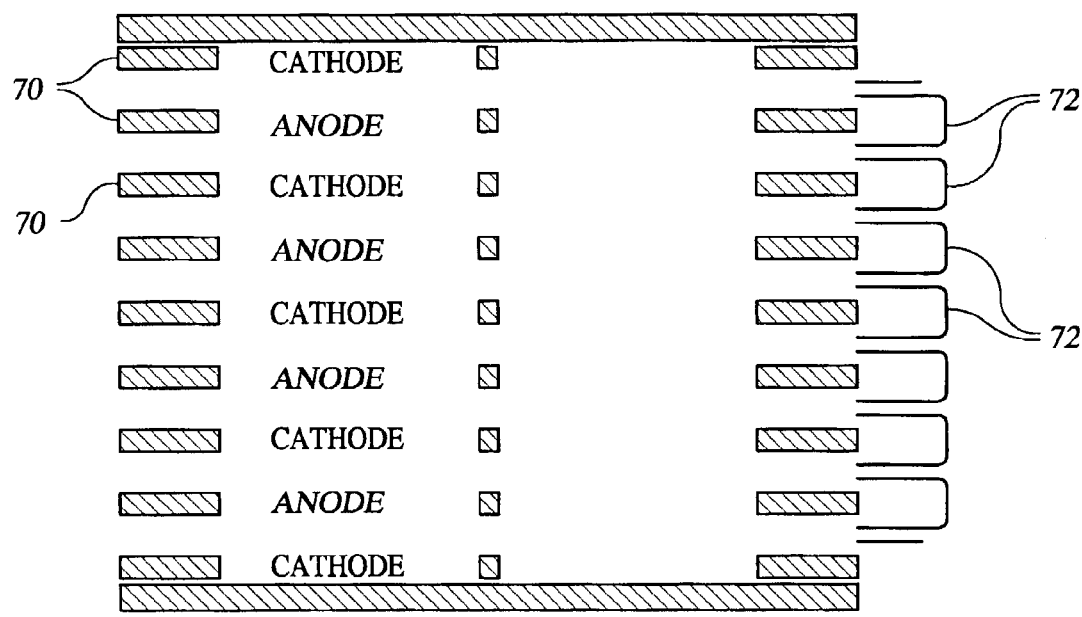
FIG. 18 is a schematic illustration of the flooded anode stacked design in one embodiment of the invention.

FIGS. 17 and 18 illustrate a conventional flooded anode stack design. In this design each cell is cut from the roll, bonded to gasket material 70 and built into a stack as shown in FIG. 18. This design has the advantage of simplicity but the disadvantage that all electrical connections must be done externally as shown at 72 in FIG. 18.

Figure 19:
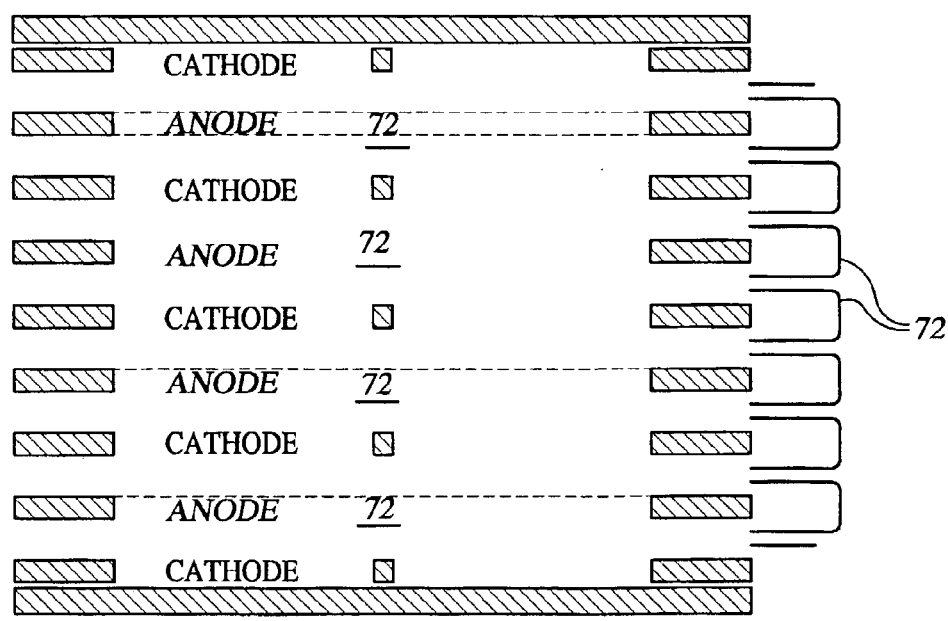
FIG. 19 is a schematic illustration of a stacked design utilizing an anode wicking medium in one embodiment of the invention.

With reference now to FIG. 19, the stack is similar to that shown in FIG. 18 except that an anode wicking medium 72 is included in each anode chamber. The stack design of FIG. 19 uses the capillary material 72 to bring fuel to the anode chamber. This design provides numerous advantages that are described in the copending and commonly owned patent application Ser. No. 10/251,244, the contents of which are incorporated herein by reference.

Modifications and variations of the invention disclosed herein will occur to those skilled in the art and it is intended that all such modifications and variations be included within the scope of the appended claims.

What is claimed is:

1. Method for making a membrane electrode assembly comprising:
   providing an elongate proton exchange membrane ("PEM") film having a front side and a back side;
   depositing a first catalyst material on the front side of the PEM film to form cathode regions in a repeating cell pattern;
   depositing a second catalyst material on the back side of the PEM film to form anode regions in the repeating cell pattern;
   providing an elongate support film with perforations in perforation regions corresponding to the repeating cell pattern;
   depositing electron conductor material onto the support film to form conductor regions in the repeating cell pattern on the perforation regions and electrical contact nubs that are connected to the conductor regions;
   providing an adhesive film with pre-cut apertures in the repeating cell pattern; and
   assembling the support and adhesive films on the front and back sides of the PEM film such that the anode and cathode regions on the PEM film are substantially aligned with the perforation regions and the electron conductor regions on the support films, thereby forming a plurality of the unit cells that are spaced from one another and are connected electrically by the electrical contact nubs.

2. The method of claim 1 wherein the proton exchange membrane film is sulphonated polytetravluoroethylene.

3. The method of claim 1 wherein the first catalyst material is platinum.

4. The method of claim 1 wherein the second catalyst material is platinum-ruthenium.

5. The method of claim 1 wherein the support film is polyimide film.

6. The method of claim 1 wherein the electronic conductor material is thin film carbon.

7. The method of claim 1 wherein the electronic conductor material is thin film metal.

8. The method of claim 1 wherein the unit cells are connected electrically in series.

9. The method of claim 1 wherein the unit cells are connected electrically in parallel.

10. The method of claim 1 further including passing the assembled films through hot rollers to laminate the films together.

11. The method of claim 1 wherein the proton exchange membrane film, the support film and the adhesive film are fed from respective rolls.

12. The method of claim 1 wherein the completed membrane electrode assembly is in the form of a continuous roll.

* * * * *